United States Patent
Zeller, III et al.

[11] Patent Number: 5,279,804
[45] Date of Patent: Jan. 18, 1994

[54] VANADIUM REMOVAL IN AQUEOUS STREAMS

[75] Inventors: Robert L. Zeller, III, Youngstown; Russell J. Morgan, Grand Island, both of N.Y.; Ursula I. Keller, Queenston, Canada

[73] Assignee: Occidental Chemical Corporation, Niagara Falls, N.Y.

[21] Appl. No.: 935,804

[22] Filed: Aug. 27, 1992

Related U.S. Application Data

[63] Continuation-in-part of Ser. No. 691,752, Apr. 26, 1991, abandoned.

[51] Int. Cl.$^5$ ............................................. C01G 37/14
[52] U.S. Cl. ................................. 423/58; 210/688; 423/65; 423/597
[58] Field of Search .................. 423/62, 63, 65, 53, 423/54, 55, 597, 58; 210/688, 691; 75/622, 623

[56] References Cited

U.S. PATENT DOCUMENTS

| | | | |
|---|---|---|---|
| 3,046,091 | 7/1962 | Van Hoozer | 423/597 |
| 4,298,582 | 11/1981 | Menashi et al. | 423/65 |
| 5,215,727 | 6/1993 | Zeller et al. | 423/55 |

FOREIGN PATENT DOCUMENTS

| | | | |
|---|---|---|---|
| 371059 | 4/1932 | United Kingdom | 423/597 |
| 376661 | 7/1932 | United Kingdom | 423/597 |

*Primary Examiner*—Wayne Langel
*Attorney, Agent, or Firm*—Wayne A. Jones; Richard D. Fuerle

[57] ABSTRACT

Disclosed is a method of removing soluble vanadium from an aqueous stream containing sodium chromate or sodium bichromate. The liquor is passed over a water-insoluble trivalent chromium compound, and the vanadium in the liquor is extracted from the liquor onto the trivalent chromium compound. The process is especially useful in removing vanadium from a recycled concentrated sodium bichromate liquor to prevent the buildup of vanadium therein.

31 Claims, 1 Drawing Sheet

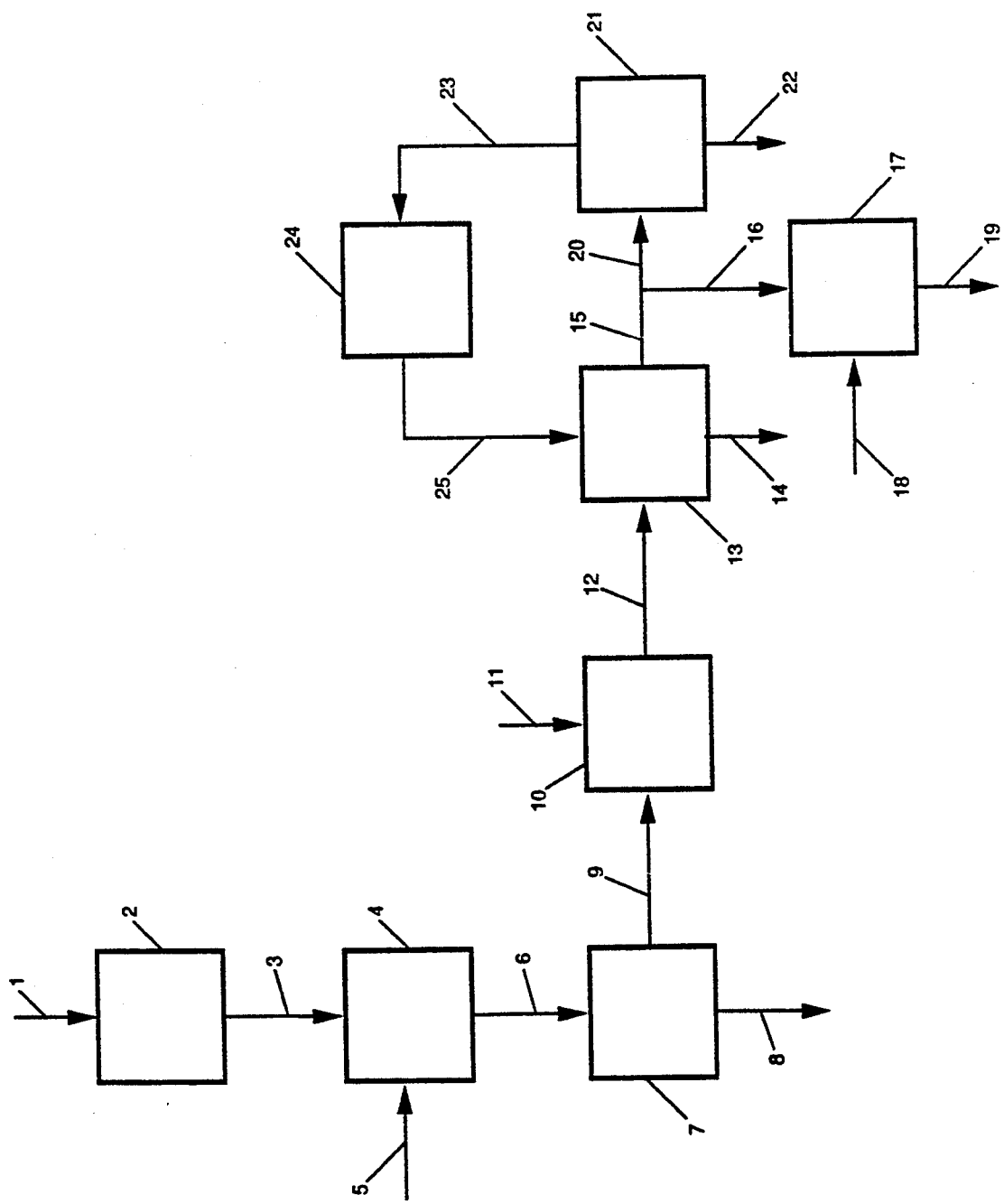

VANADIUM REMOVAL IN AQUEOUS STREAMS

This application is a continuation-in-part of application Ser. No. 07/691,752, filed Apr. 26, 1991, and now abandoned.

BACKGROUND OF THE INVENTION

This invention relates to a process for reducing the vanadium content of an aqueous stream. In particular, the invention relates to passing a sodium chromate or sodium bichromate liquor containing dissolved vanadium over an insoluble trivalent chromium compound.

The principal uses for sodium bichromate are in leather tanning, metal finishing, chrome metal manufacturing, and chromate pigments manufacturing. In leather tanning, the sodium bichromate in the liquor is converted to basic chrome sulfate, which is then used in tanning the leather. Even small amounts of vanadium (e.g., less than 1000 ppm) in the bichromate liquor can result in discoloration of the leather. Sodium bichromate is used to manufacture $Cr_2O_3$ which in turn is converted into chrome metal. Chrome metal is used for making super alloys, which are high temperature, high strength alloys of chromium used in the turbine blades of jet engines. The properties of these alloys are very sensitive to the presence of vanadium and other metal contaminants. Vanadium concentrations in excess of about 100 ppm are not desirable. Vanadium in sodium bichromate at concentrations of <100 ppm may also affect the properties of chromate based pigments.

Sodium bichromate liquor is now being made commercially by roasting chromite ore, leaching sodium chromate from the ore, and filtering off the solids. The presence of lime in the ore results in the precipitation of calcium vanadate, which is removed with the solids in the filtration. This reduces the vanadium concentration of the liquor to about 120 ppm. The sodium chromate liquor is then acidified with sulfuric acid and is partially evaporated to precipitate sodium sulfate and form a sodium bichromate liquor. Some of the sodium bichromate liquor is sold or used to make chromic acid and the remainder is cooled, which results in the precipitation of sodium bichromate crystals. The remaining liquor is then recycled to the evaporation stage.

Since little of the vanadium that is in the liquor is entrained with the sodium bichromate crystals, as the sodium bichromate liquor is recycled and new vanadium-containing liquor is processed, the vanadium concentration in the liquor tends to increase. As the vanadium concentration in the sodium bichromate liquor builds up, the amount of vanadium in the sodium bichromate crystals increases. If the production and sale of sodium bichromate liquor is large compared to that of the crystals, then the liquor sales provide an adequate purge for vanadium at levels below customer specifications. However, if the production of liquor is reduced, or the production of crystals is increased, then the concentration of vanadium in the liquor may become unacceptably high without a secondary removal method. Thus, under certain market conditions, a method is needed for removing vanadium either from the recycled sodium bichromate liquor or in the sodium chromate solution which ultimately feeds the bichromate process. Until now, little technology was available for producing a concentrated sodium bichromate liquor containing less than 100 ppm of vanadium. One method was to crystallize the sodium bichromate and redissolve the crystals, a procedure that is too costly to be of much commercial value. Even ion exchange resins are ineffective in removing vanadium from concentrated bichromate liquors because the liquor attacks the ion exchange resin.

SUMMARY OF INVENTION

We have discovered that the vanadium concentration in concentrated sodium chromate and sodium bichromate liquors can be reduced from about 120 ppm to less than about 20 ppm by contacting the liquors with a water-insoluble trivalent chromium compound. The sodium chromate or bichromate liquor can be passed over the trivalent chromium compound in one or more stages in the recycle loop in the process for making sodium bichromate. Once the trivalent chromium compound has become saturated with vanadium it can be returned to the ore roasting stage to recover the chromium in it or it can be regenerated chemically and reused. By preventing the buildup of vanadium in the recycle loop the process of this invention enables one to economically produce a sodium bichromate liquor having the low vanadium concentration required for many applications regardless of prevailing product mixes or market conditions.

BRIEF DESCRIPTION OF DRAWING

The accompanying drawing is a block diagram illustrating a certain presently preferred embodiment of a process of this invention for producing sodium bichromate liquor and sodium bichromate crystals of low vanadium content.

DESCRIPTION OF INVENTION

In the drawing, soda ash (sodium carbonate) and ore containing chromium and vanadium are admitted through line 1 to kiln or rotary hearth furnace 2 where it is roasted at a temperature of about 1350° C. The roasted ore then passes through line 3 to leach tank 4 where water from line 5 is added and the liquor is neutralized to a pH of about 8.5. This leaches out chromium and forms a liquor containing sodium chromate and contaminates such as about 120 ppm vanadium, believed to be present as the vanadate ion, $VO_4^{-3}$. The resulting slurry of the sodium chromate liquor and various solids passes through line 6 to filter 7 where the solids are filtered off through line 8. The solids include ore tailings and vanadium that precipitated as calcium vanadate. The filtrate passes through line 9 to acidification tank 10 where sulfuric acid from line 11 is added to lower the pH to about 3.7 and convert the sodium chromate, $Na_2CrO_4$, to sodium bichromate, $Na_2Cr_2O_7$. In practice, virgin sulfuric acid is seldom used. Sulfuric acid and sodium bisulfate containing liquors from the chromic acid process are typically used in the neutralization and acidification steps. The sodium bichromate liquor passes through line 12 to evaporator 13 where the water in the liquor is evaporated to about 85 wt % solids, resulting in the precipitation of sodium sulfate, which is removed through line 14. The 85 wt % sodium bichromate liquor passes through lines 15 and 16 to reactor 17 where sulfuric acid from line 18 is added to produce chromic acid in line 19. The 85 wt % sodium bichromate liquor also passes through line 20 to vacuum crystallizers 21 where it is cooled to about 49° to 54° C. under vacuum to precipitate sodium bichromate crystals. The crystals are removed through line 22 and the filtrate passes through line 23 to vanadium removal bed 24, which contains a water-insoluble trivalent chromium compound. As the liquor passes over the trivalent chromium compound, the vanadium in the liquor remains on the compound and the liquor continues on through line 25 back to evaporator 13. When the trivalent chromium compound becomes saturated with vanadium and is no longer effectively removing vanadium, it can be recycled to the kiln/furnace 2 to recover the chromium in it. However, it is preferable to regenerate the trivalent chromium compound. This can be accomplished by, for example, treatment with a dilute solution of a strong acid such as nitric acid or hydrochloric acid; hydrochloric acid is preferred because it regenerates nearly 100% of the trivalent chromium. Vanadium can be recovered from the spent acid.

Variations on the process described in the drawing are also contemplated within the scope of this invention. For example, vanadium removal bed 24 could be placed on a portion of stream 16 to produce low vanadium bichromate liquor as needed. It could also be placed in line 9, especially when crystallizer 21 is periodically shut down, so that vanadium does not build up in the recycle loop. The overall process of producing sodium bichromate from chromite ore, without the vanadium removal step of this invention, is described in Kirk-Othmer Encyclopedia of Chemical Technology, Third Ed., Vol. 6, pages 92 to 94, and "Chromium," by M. J. Udy, Vol. I, page 268, herein incorporated by reference.

The process of this invention is applicable to any aqueous stream that is chemically inert to the trivalent chromium compound and that contains up to about 2500 ppm of dissolved vanadium (at over 3000 ppm vanadium precipitates). While it can be used to remove vanadium from more or less uncontaminated water, it can also be used to remove vanadium from streams containing chromates. In addition to the application shown in drawing, the invention may also be applied to bichromate processes that employ $CO_2$ as the acidification media. In those processes, the pH of chromate liquor is lowered to about 6.5 with $CO_2$ introduced under pressure. Sodium bichromate crystals are fractionally crystallized and recovered from this solution and the mother liquor is recycled to the crystallizer. The process of this invention is especially useful with concentrated (i.e., greater than 20 wt % for sodium bichromate and greater than 10 wt % for sodium chromate and mixtures of sodium chromate and sodium bichromate) bichromate or chromate liquors because alternative inexpensive methods of removing vanadium from those liquors are not available. A concentrated sodium bichromate liquor typically has a pH of about 3.7 to about 4 and contains about 69% by weight sodium bichromate, about 120 ppm vanadium, and minor amounts of chloride, aluminum, sulfate, iron, calcium, and magnesium. While the amount of trivalent chromium compound used can vary considerably, it is preferable to use a ratio of vanadium removed (calculated as vanadium) to trivalent chromium compound (calculated as chromium) of about $1\times10^{-5}$ to about $1\times10^{-1}$ and most preferably about $1\times10^{-3}$ to about $1\times10^{-2}$.

Trivalent chromium compounds that are useful in the process of this invention must be water-insoluble (i.e., have a solubility of less than 0.01 grams per liter) so that significant amounts of trivalent chromium are not added to the sodium bichromate liquor. Of course, the insoluble trivalent chromium compounds should not be already saturated with vanadium or otherwise rendered ineffective. Preferably, the trivalent chromium compound is in a form that has a large surface area to ensure maximum contact with the vanadium in solution. Examples of suitable insoluble trivalent chromium compounds include copper chromite and chromic oxide, $Cr_2O_3 \cdot xH_2O$, where "x" is 0 to 3, but can be higher. $Cr_2O_3 \cdot xH_2O$ includes chromic oxide, $Cr_2O_3$, when $x=0$, CrOOH when $x=1$, Gringnet's green when $x=2$, and chromic hydroxide, $Cr(OH)_3$, when $x=3$. The preferred trivalent chromium compound is a hydrous chromium oxide, as it is the most effective of the compounds tested per unit weight for removing vanadium. Although we do not wish to be bound by any theories, we believe that the high surface area of the hydrous chromium oxide may have contributed to its effectiveness. A preparation of that compound is described in Example 10 which follows. The trivalent chromium compound used in this invention is not prepared in situ, but is prepared separately from the aqueous stream containing the vanadium.

The removal of vanadium from sodium chromate liquors is similar except that the pH of the liquor is typically about 8 to about 10. The removal of vanadium from mixtures of sodium chromate and sodium bichromate occurs at pH's between about 3.7 and about 9.5, depending on chromate and bichromate concentrations. The temperature and pH during the vanadium-removal step do not seem to be critical and the process is typically operated at room temperature. Removal of the vanadium from the liquor is very fast and usually requires less than two hours contact between the liquor and the trivalent chromium compound.

The following examples further illustrate this invention:

EXAMPLE 1

Freshly precipitated chromium hydroxide, $Cr(OH)_3$, was prepared by dissolving chromium sulfate hydrate in water and adjusting the pH to 9 with 1N NaOH. The chromium hydroxide precipitate was collected by vacuum filtration and was dried in air. Then 5.5 g of the chromium hydroxide was contacted with 100 g of 69 wt % sodium bichromate for 2 hours. The initial vanadium concentration of the solution was 110 ppm, but after mixing with the chromium hydroxide it was only 84 ppm. This experiment shows that chromium hydroxide can remove vanadium from bichromate liquors.

EXAMPLE 2

Two different samples of chromic oxide, $Cr_2O_3$, prepared by the thermal decomposition reaction of $(NH_4)_2Cr_2O_7$ were tested. In each test 12.5 g of chromic oxide was mixed with 100 g of 69 wt % sodium bichromate liquor for 2 hours. The results are presented below:

| Sample | Initial Vanadium Concentration (ppm) | Final Vanadium Concentration (ppm) |
|---|---|---|
| 1 | 220 | 110 |
| 2 | 220 | 97 |

This experiment shows that crystalline chromic oxide can remove vanadium from bichromate liquors.

EXAMPLE 3

100 g of sodium chromate liquor (about 32 wt % $Na_2CrO_4$ at a pH of 8.4) was mixed for 2 hours with 12.5 g of a hydrous chromium oxide (believed to be CrOOH). The initial vanadium concentration was 76 ppm and the final vanadium concentration was 1.1 ppm, which is near the detectable limit for vanadium.

This experiment shows that CrOOH is effective in removing vanadium from chromate liquors.

EXAMPLE 4

The effect of bichromate liquor concentration on the removal of vanadium by CrOOH was determined. In each case, 3.5 g of a hydrous chromium oxide (believed to be CrOOH) was mixed with 100 g sodium bichromate liquor of variable concentration. The results are presented below:

| Sample | Initial Vanadium Concentration (ppm) | Final Vanadium Concentration (ppm) |
| --- | --- | --- |
| 20 wt % | 32 | 3.9 |
| 45 wt % | 70 | 26 |
| 69 wt % | 110 | 55 |

This experiment shows that CrOOH is effective in removing vanadium from bichromate liquors even when the bichromate liquor is concentrated.

EXAMPLE 5

To 100 g samples of a 69% bichromate liquor containing vanadium (as $VO_4^{-3}$) was mixed various amounts of CrOOH for 2 hours. The following table gives the amount of CrOOH used and the initial and final vanadium concentrations.

| g of CrOOH* per 100 g of 69% Bichromate Liquor | Initial Vanadium Concentration (ppm) | Final Vanadium Concentration (ppm) |
| --- | --- | --- |
| 0.1 | 120 | 110 |
| 0.5 | 120 | 100 |
| 1.0 | 120 | 91 |
| 1.5 | 120 | 85 |
| 3.5 | 110 | 55 |
| 5.0 | 120 | 45 |
| 12.5 | 120 | 16 |
| 15.0 | 120 | 19 |

*a hydrous chromium oxide believed to be CrOOH

The table shows that increasing the grams of CrOOH in contact with the bichromate liquor decreases the vanadium concentration (i.e., increases the removal of vanadium).

EXAMPLE 6

Excess $V_2O_5$ was mixed with 200 g deionized water for 16 hours. The slurry was filtered and the filtrate was recovered. 100 g of this filtrate, saturated with $V_2O_5$, was treated with 10 g of a hydrous chromium oxide (believed to be CrOOH) by mixing for 2 hours and filtering. Before treatment, the vanadium concentration was 500 ppm and after treatment it was 180 ppm. This example shows that Cr(III) can remove vanadium without the presence of Cr(VI).

EXAMPLE 7

A 12.5 g sample of a hydrous chromium oxide (believed to be CrOOH) and 1.25 g of filter aid (perlite) was mixed with 100 g of 69 wt % sodium bichromate solution for 2 hours. (Other filter aids, such as diatomaceous earth, could also be used.) Four times the sample was filtered, regenerated, and exposed to a fresh 100 g 69 wt % sodium bichromate solution for 2 hours. A single regeneration step consisted of boiling the sample for 5 minutes in 50 ml of 10% HCl followed by washing with 50 ml water at 25° C. The initial vanadium concentration of the bichromate liquor was 110 to 130 ppm. The following table gives the results.

| Cycle | Vanadium Concentration in the Sodium Bichromate Liquor (ppm) | Number of Regeneration Steps |
| --- | --- | --- |
| 1 | 11.5 | — |
| 2 | 0.11* | 3 |
| 3 | 3.5 | 3 |
| 4 | 4.8 | 3 |
| 5 | 8.5 | 1 |

*Method Detection Limit Approached.

Not only does the table show that the CrOOH sample can be regenerated, but it also shows that the regeneration actually improves the ability of the sample to remove vanadium, although with repeated regenerations the effectiveness of the sample appears to decline. The increase, albeit small, in vanadium concentration with repeated regenerations is believed to be due to the loss of materials from repeated transfers of the materials; this is not expected to occur in a commercial operation.

EXAMPLE 8

The purpose of this example was to determine whether a filter aid is effective in reducing the filtration time required for regeneration. Two 12.5 g samples of CrOOH were separately mixed with 100 g of 69 wt % sodium bichromate for 2 hours. Each sample was filtered, but one sample was filtered with 10 wt % of perlite filter aid. The samples were then washed with 50 ml of room temperature 10% HCl for five minutes, followed by rinsing with 50 ml water. The samples were then separately mixed with 100 g of 69 wt % sodium bichromate for 2 hours and again were filtered, one without the filter aid and one with the filter aid. The following table is the time in minutes and seconds required for these steps.

| Steps | Sample with No Filter Aid (Minutes:Seconds) | Sample with Filter Aid (Minutes:Seconds) |
| --- | --- | --- |
| First Cycle | 18:49 | 11:25 |
| Wash | 00:52 | 1:22 |
| Rinse | 16:07 | 7:00 |
| Second Cycle | 55:31 | 9:53 |

The above table shows that the use of a filter aid was very effective in reducing filtration time.

EXAMPLE 9

In five separate tests 12.5 g of a hydrous chromium oxide (believed to be CrOOH) was added to a solution of 100 g 69 wt % sodium bichromate containing 120 ppm vanadium. After continuous mixing for various periods of time the slurries were filtered and the vanadium content of the bichromate was measured. The following table gives the results.

| Mix Time (min.) | V (ppm) in Bichromate |
| --- | --- |
| 10 | 13.0 |
| 30 | 9.9 |
| 60 | 9.3 |
| 120 | 8.2 |

-continued

| Mix Time (min.) | V (ppm) in Bichromate |
|---|---|
| 1440 | 7.2 |

This example shows that the reaction is fast and is about 97% complete in ten minutes.

EXAMPLE 10

A mixture was prepared of 36.43 g refined sugar, 159.73 g $Na_2Cr_2O_7 \cdot 2H_2O$, and 1465.8g deionized water. The mixure was heated with agitation in an autoclave at 300° C. and 1300 psi for 30 minutes. After cooling and filtering, the filter cake was re-slurried and washed several times. The product, a hydrous chromium oxide (believed to be CrOOH), was dried at 130° C. for 16 hours.

EXAMPLE 11

This example shows the effect of surface area on vanadium removal. CrOOH, prepared as in Example 10, was heated to a predetermined temperature and held for a certain length of time. This collapsed the CrOOH particle by releasing water vapor and forming $Cr_2O_3$. The higher the temperature, the smaller the surface area. 12.5 g of particles were added to a solution of 69 wt % sodium bichromate containing 100 ppm vanadium. After continuous mixing for 2 hours, the slurries were filtered and the vanadium content of the bichromate was measured. The following table gives the results.

| Temperature °C. | Time (min.) | % Weight Loss | Surface Area ($m^2/g$) | V in Bichromate (ppm) |
|---|---|---|---|---|
| As-is | NA | 0% | 307.9 | 9.3 |
| 350 | 30 | 4.4% | 205.6 | 20 |
| 500 | 7.5 | 10.5% | 135.9 | 36 |
| 900 | 15 | 20.9% | 7.7 | 72 |

This example shows that a higher surface area removed more dissolved vanadium from the solution.

We claim:

1. A process for removing dissolved vanadium from an aqueous stream containing more than 20 ppm of dissolved vanadium comprising
   (A) preparing, separately from said stream, a water-insoluble trivalent chromium compound;
   (B) contacting said stream with said trivalent chromium compound, whereby said dissolved vanadium is absorbed onto said trivalent chromium compound; and
   (C) separating said trivalent chromium compound from said stream.

2. A process according to claim 1 wherein said aqueous stream is a liquor of sodium chromate, sodium bichromate, or mixtures thereof.

3. A process according to claim 1 wherein the concentration of said dissolved vanadium is less than 2500 ppm.

4. A process according to claim 1 wherein the concentration of said dissolved vanadium is less than 1000 ppm.

5. A process according to claim 1 wherein the concentration of said dissolved vanadium is less than 120 ppm.

6. A process according to claim 1 wherein said trivalent chromium compound is a hydrous chromium oxide.

7. A process according to claim 1 wherein said trivalent chromium compound is $Cr_2O_3 \cdot xH_2O$, where x is 0 to 3.

8. A process according to claim 1 wherein said liquor is sodium bichromate and its concentration is greater than 20 wt %.

9. A process according to claim 1 wherein said liquor is sodium chromate and its concentration is greater than 10 wt %.

10. A process according to claim 1 wherein said liquor is a mixture of sodium chromate and sodium bichromate with a total chrome concentration greater than 10 wt % on a sodium bichromate dihydrate basis.

11. A process according to claim 1 wherein the ratio of vanadium removed to trivalent chromium is about $1 \times 10^{-5}$ to about $1 \times 10^{-1}$.

12. A process according to claim 11 wherein said ratio is about $1 \times 10^{-3}$ to about $1 \times 10^{-2}$.

13. A process according to claim 1 including the additional last step of regenerating said trivalent chromium compound when it becomes saturated with vanadium by treatment with a dilute solution of a strong acid.

14. A process according to claim 13 wherein said strong acid is hydrochloric acid.

15. A process according to claim 2 including, as an additional and separate last step, manufacturing $Cr_2O_3$ from said sodium bichromate.

16. In a process for making sodium bichromate where an aqueous liquor containing sodium bichromate is evaporated in an evaporator, then cooled to precipitate sodium bichromate crystals in a crystallizer, and at least a portion of the liquor from the crystallizer is recycled to the evaporator, the improvement which comprises removing dissolved vanadium from said recycled liquor by
   (A) preparing, separately from said recycled liquor, a water-insoluble trivalent chromium compound; and
   (B) bringing said recycled liquor into contact with said water-insoluble trivalent chromium compound.

17. The process of claim 16 wherein said water-insoluble trivalent chromium compound is hydrous chromium oxide.

18. The process of claim 16 including the additional last step of roasting said trivalent chromium compound when it becomes saturated with vanadium to recover the chromium therein.

19. The process of claim 16 including the additional last step of regenerating said trivalent chromium compound when it becomes saturated with vanadium by treatment with a dilute solution of a strong acid.

20. The process of claim 19 wherein said strong acid is hydrochloric acid.

21. The process of claim 16 wherein the ratio of vanadium removed to trivalent chromium is about $1 \times 10^{-5}$ to about $1 \times 10^{-1}$.

22. The process of claim 16 wherein said ratio is about $1 \times 10^{-3}$ to about $1 \times 10^{-2}$.

23. A process according to claim 16 including, as an additional and separate last step, manufacturing $Cr_2O_3$ from said sodium bichromate.

24. In a process of making sodium bichromate where $CO_2$ is used to acidify a sodium chromate liquor with subsequent recovery of bichromate crystals and return of the treated liquor to the loop, the improvement which comprises removing dissolved vanadium from said liquor by (A) preparing, separately from said liquor, a water-insoluble trivalent chromium compound, and
(B) bringing said liquor into contact with said water-insoluble trivalent chromium compound.

25. The process of claim 24 wherein said water-insoluble trivalent chromium compound is a hydrous chromium oxide.

26. The process of claim 24 including the additional last step of roasting said trivalent chromium compound when it becomes saturated with vanadium to recover the chromium therein.

27. The process of claim 24 including the additional last step of regenerating said trivalent chromium compound when it becomes exhausted with vanadium by treatment with a dilute solution of a strong acid.

28. The process of claim 27 wherein said strong acid is hydrochloric acid.

29. The process of claim 24 wherein the ratio of vanadium removed to trivalent chromium is about $1 \times 10^{-5}$ to about $1 \times 10^{-1}$.

30. The process of claim 24 wherein said ratio is about $1 \times 10^{-3}$ to about $1 \times 10^{-2}$.

31. A process according to claim 24 including, as an additional and separate last step, manufacturing $Cr_2O_3$ from said sodium bichromate.

* * * * *